United States Patent [19]

Vanden Bosch

[11] 4,010,966
[45] Mar. 8, 1977

[54] PIPE COUPLER

[76] Inventor: Paul G. Vanden Bosch, Box 222, Gregory, S. Dak. 57533

[22] Filed: Mar. 18, 1976

[21] Appl. No.: 668,205

[52] U.S. Cl. .............................. 285/403; 285/421
[51] Int. Cl.² .................... F16L 21/00; F16L 25/00
[58] Field of Search .......... 285/403, 421, 420, 176, 285/305

[56] References Cited

UNITED STATES PATENTS

| | | | |
|---|---|---|---|
| 2,717,789 | 9/1955 | Taylor | 285/421 |
| 3,472,538 | 10/1969 | Vincent et al. | 285/403 |
| 3,479,069 | 11/1969 | Sedam | 285/403 |

*Primary Examiner*—Patrick D. Lawson
*Attorney, Agent, or Firm*—Merchant, Gould, Smith, Edell, Welter & Schmidt

[57] ABSTRACT

A pipe coupler has male and female portions each adapted for attachment as by welding or the like to the ends of pipe lengths. The male element, which is noncircular in cross section, telescopes into a like configured bore in the female portion, with the forward end of the male coupler abutting an internal step of a female coupler. A pair of keys fit within parallel slots on opposite sides of the female coupler, and in position in aligned recesses provided in the male coupler. First and second edges of the key blocks are disposed at a small angle to each other, so that the keys may be wedged tightly into place holding the male and female couplers in fluid tight sealing relationship.

5 Claims, 6 Drawing Figures

PIPE COUPLER

BACKGROUND OF THE INVENTION

The present invention pertains generally to the field of pipe couplers, and is particularly adapted to the field of couplers for use in well drilling operations.

In such operations, the rotary drilling force is applied through the pipe itself, and this requires that the couplers use between adjacent lengths of pipe be capable of withstanding the considerable torque loads applied. At the same time, the outside diameter of the coupling must be kept to a minimum addition over the diameter of the pipe itself, so as to avoid undue restrictions when lowering the pipe into the drill hole. However, the internal dimensions of the fluid passageway must be kept as close to the internal dimensions of the pipe itself, so as to avoid introducing undue restrictions in terms of the pumping of fluid through the pipes and couplers.

It is also necessary that the coupler be simple and efficient in engagement and locking, so that the drilling process will not be impeded by the amount of time required to adjoin lengths of pipe.

The above requirements for pipe couplers impose severe, and sometimes contradictory, constraints upon the design of a coupler system, and although numerous prior art systems have been proposed and have achieved workable results, there has always been room for further improvement in terms of size, efficiency and cost.

SUMMARY OF THE INVENTION

Accordingly, the present invention provides an improved pipe coupler which is very efficient both in terms of size and operating ease. The coupler includes a male coupling element having a fluid passageway through the element generally along its longitudinal axis. The rearward end of the element is adapted for attachment to a pipe as by welding or the like. The forward end is adapted for abutment and sealing within the other part of the coupler. The male coupler element has a non-circular cross sectional configuration, with a pair of recesses formed in the outer surface of the element on opposite sides thereof. The recesses have forward walls generally transverse to the longitudinal axis.

The female element of the coupler also has a rearward end adapted for attachment to a pipe, as by welding or the like. The forward portion of the female element has a non-circular bore configured to conform to the outside shape of the male portion, for telescopic, non-rotational, engagement therewith. The female element has an internal narrowing step adjacent the forward portion, for abutment with the forward end of the male coupler element when they are telescopically engaged. The step portion has a fluid passageway therethrough in alignment with the fluid passageway of the male coupler element, so as to provide unrestricted fluid flow therethrough.

The female coupler element includes a pair of slots formed therein extending parallel to each other on opposite sides thereof, and in alignment with the recesses of the male coupler element when telescopically positioned in said female coupling element.

A pair of key blocks are each sized to fit within one of the slots so as to be positioned within the recesses, when the elements are telescopically engaged. Each key block has a first edge for engagement with a surface of the slot of the female coupling element, and a second edge at a small angle to the first edge for wedging engagement with the forward wall of the recess of the male coupler element. Means are provided for securing the key blocks within the slots so as to wedge the male and female coupling elements together.

DETAILED DESCRIPTION OF THE PREFERRED EMBODIMENT

Figure 2:
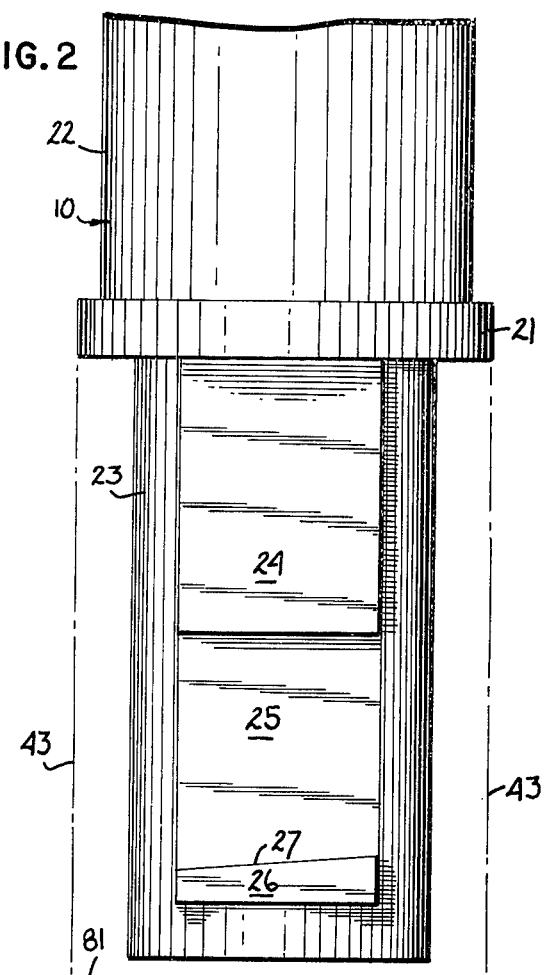
FIG. 2 is an exploded view in side elevation of the coupler assembly of FIG. 1.

As best seen in FIG. 2, the main elements of the pipe coupler are the male coupler element 10, female coupler element 12, and key means 14. These elements are preferably made by casting, although machining may be required on critically dimensioned areas. Male coupler element 10 includes a body extending generally along a longitudinal axis, which in the orientation of FIG. 2, is vertical. At the upper portion of the male coupler element in the orientation of FIG. 2, which will arbitrarily be called the rearward end, there is a disc-like cylindrical flange 21. Reference numeral 22 designates the end of a length of pipe which is shown attached to the flange 21. This attachment can be done by any conventional means, preferably welding.

The main body of male coupler element 10 may be attached to or formed integrally with flange 21, and comprises a generally cylindrical surface indicated by reference numeral 23. A pair of roughly rectangular flat surfaces extend outwardly from the cylindrical surface 23, one of which is visible in the view of FIG. 2, and is designated by reference numeral 24. The flat raised portion 24, and a corresponding surface on the other side of the element serve to make the coupler element non-circular in cross sectional configuration, so that torque loads can be transmitted through the coupler as explained hereinafter. Adjacent and forward of raised area 24 is a recess 25. Forward of recess 25 is a further raised area 26. The step or wall 27 between recess 25 and raised area 26 comprises the forward wall of recess 25. This forward wall is vertical according to the orientation of FIG. 2, and substantially transverse to the longitudinal axis of the coupler. Surface 25 is one of the wedging surfaces use to secure the coupler as explained hereinafter.

In FIG. 2, female coupler element 12 includes a tapered rearward end 41 which is adapted for attachment as by welding to the end of a further cylindrical pipe length 42. Coupler element 12 includes a forward portion having a generally cylindrical outer surface 44. The internal dimensions of forward portion 44 are configured to accept the male coupler element which may be telescoped therein as indicated by center lines 43.

Female coupler element 12 includes a pair of slots, one of which is visible in FIG. 2 and is indicated by reference numeral 45. Slot 45 is cut into and through female coupler element 12 in a plane parallel to the plane of FIG. 2, passing through cylindrical surface 44 above the central axis thereof. The corresponding slot 46 on the other side not visible in FIG. 2, is parallel to slot 45 and passes on the other side with respect to the central axis.

Figures 3, 4:
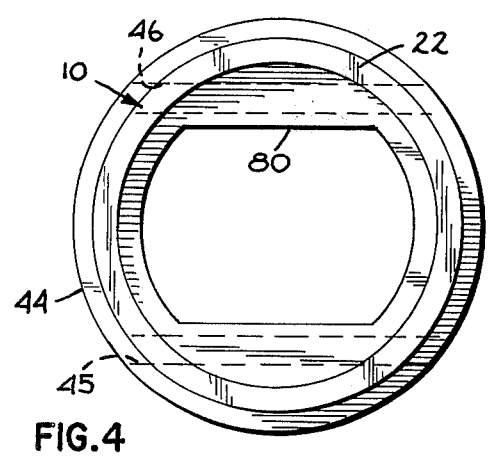
FIG. 3 is a view in perspective of the key means of the coupler assembly.
FIG. 4 is a view in top plan of the coupler assembly.

The positioning of the slots may be better understood in the top view of FIG. 4, wherein slot 45 and the corresponding slot 46 on the opposite side are shown in broken lines.

Referring again to FIG. 2, the left-hand opening of slot 45 includes an upper portion 45a and a lower portion 45b. The right-hand opening of slot 45 includes an upper portion 45c. Portions of the wall of the female coupler are seen in section where slot 45 cuts therethrough. Over the center portion of slot 45, the cylindrical wall of the female coupling element is completely cutaway. This cutaway central portion is bounded by edges 71 and 72.

As indicated in FIG. 2 by center line 47, key means 14 is designed for sliding into the slots thus provided in the female coupler element. Key means 14 is better seen in the perspective view of FIG. 3. It comprises a pair of key blocks generally designated by reference numerals 51 and 52. These blocks are interconnected by means of an arcuate bridge member 53 which may be attached thereto or integrally formed therewith. A special cylindrically recessed surface 54 is provided in female coupler element 12 (FIG. 2) between slots 45 and 46 to accommodate bridge 53.

In FIG. 3, block 52 has a generally flat inner surface 56, and block 51 has a corresponding flat inner surface 57. The outer surface 59 of block 51 is generally cylindrical in configuration in conformance with cylindrical outer surface 44 of the female coupler element. The outer surface of key block 52 is likewise cylindrical, although not visible in FIG. 3.

Key block 51 has an upper flat surface 61 and a co-planar flat surface 63. These surfaces enable the key block to fit within the narrow portion 45a, 45b of slot 45, with cylindrical surface 59 fitting into the cutaway central portion of slot 45.

An edge or step 65 is provided between upper flat portion 61 and cylindrical outer portion 59. This edge 65 engages edge 71 of the cutaway central portion of slot 45, when the key is engaged. Another step or edge 67 is provided between lower flat portion 63 and cylindrical portion 59. Step 67 slides adjacent lower edge 73 of the central cutaway portion of slot 45. A wedge surface 69 is provided at the bottom edge of the key block in the orientation of FIGS. 2 and 3. This surface or edge is at a slight angle with respect to edge 65 so as to help wedge the assembly tightly together, as explained hereinafter. A pair of bolts, 75 and 76 are provided respectively in the key blocks. These bolts are aligned with securing tabs such as at 77 in the outer surface of female coupler element 12. Tab 77 includes a hole for receiving the bolt, which may then be secured by means of a nut 79.

Figure 1:
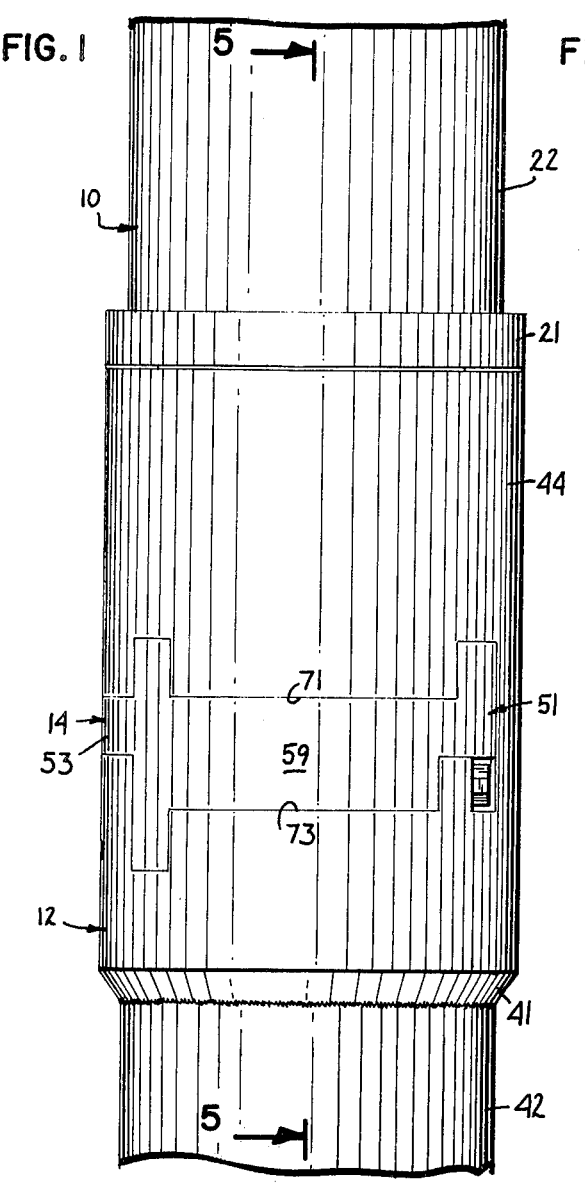
FIG. 1 is a view in side elevation of a coupler assembly according to the present invention.

FIG. 1 shows the male and female coupler elements telescoped together, with key member 14 in place, and secured by nut 79. Since the outer surface 59 of key 14 which is visible in the drawing of FIG. 1 is cylindrical and conforms with the cylindrical outer surface 44 of female coupler element 12, a continuous surface, free of obstructions or projections is provided for ease in drilling work.

Figure 5:
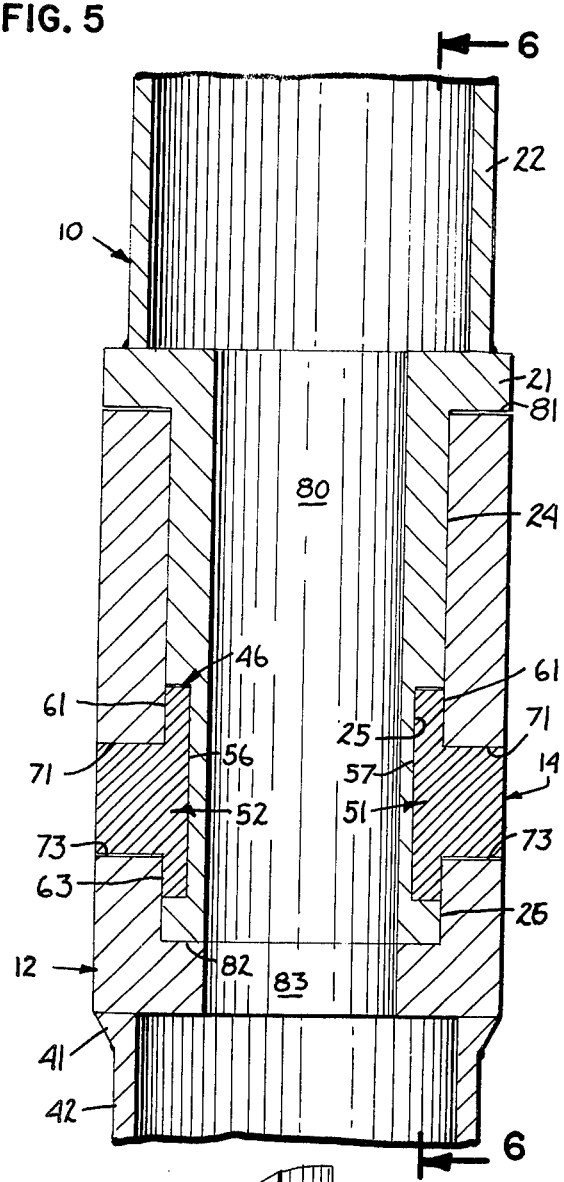
FIG. 5 is a sectional view of the coupler assembly taken generally along line 5—5 of FIG. 1.
Figure 6:
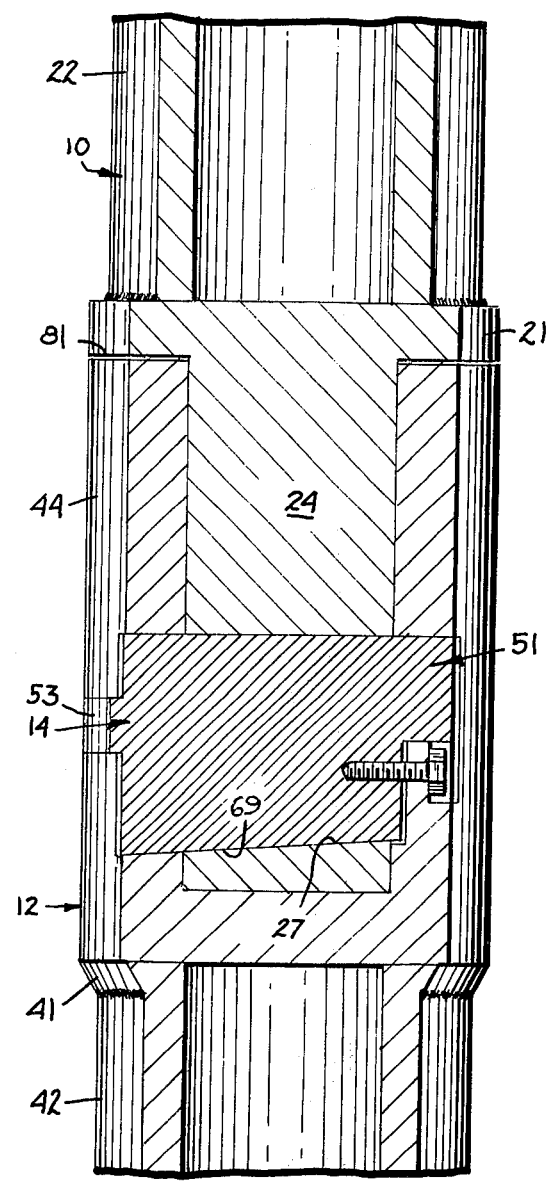
FIG. 6 is a sectional view taken generally along lines 6—6 of FIG. 5.

The internal configuration of the elements is better seen in the cutaway views of FIGS. 5 and 6. In FIG. 5, sections of pipes 22 and 42 are clearly seen, where they attach to the rearward ends of male coupler element 10, and female coupler element 12, respectively. In the case of the male element, pipe 22 is welded to flange 21. In the direction that the section of FIG. 5 has been taken, cylindrical wall 23 is not visible, but raised flat wall 24 is seen, together with the corresponding flat raised section on the opposite side of the element. Raised flat section 26 is also seen in section, and the recessed area 25 therebetween is visible. Forward wall 27 of recess 25 is also shown.

A central bore is provided in the male coupling element to define a fluid passageway 80.

The forward portion of female coupler element 12 is configured to conform to the outer shape of the male coupler element, as generally indicated in FIG. 5. The top edge 81 of the female coupler fits adjacent flange 21. At the rearward end of the female coupler, there is provided an internal narrowing step 82 which extends annularly around the center axis of the coupler. An opening 83 is provided in the step, and this forms a continuation of the fluid passageway from pipe 22, fluid passageway 80, opening 83, to pipe 42. The forward end 29 of the male coupling element abuts step 82, to provide the fluid tight seal. Alternatively, end 29 and step 82 can be tapered to fit one another to provide a seal.

As seen in the section of FIG. 6, when the key member is in place, key block 59 is tightened securely to the right by means of nut 79. This draws wedge surface 69 into engagement with the wedge surface 27 which forms the forward wall of the recess in the male coupler element. As these surfaces wedge together, edge 65 of the key block is pushed into load bearing engagement with edge 71 of the cutaway portion of the slot. With a compression force thus established between the male and female coupling elements, forward edge 29 of the male element is forced into tight fluid sealing contact with internal step 82, thus establishing a seal. The contact between forward edge 81 of the female coupler and flange 21 of the male coupler, while kept close to prevent the working in of dirt and the like, should not be so tight as to prevent establishment of a tight tolerance at the aforementioned contact of edge 29 and step 82. A groove and O-ring can be provided at the junction of edge 81 and flange 21, if desired.

It will be appreciated that the bridge 53 of key means 14 is optional, in that key blocks 51 and 52 could be made separately, and could be separately inserted into the respective slots to hold the coupler together. However, bridge 53 or other connecting means is preferred in order to simplify assembly of the coupler in the field. Key blocks 51 and 52 could be cast separately, then attached by bridge 53 which can be made of a slightly flexible material that will allow slight adjustments in the positioning of the key blocks when in place, so as to compensate for wear.

Although the preferred embodiment disclosed herein shows step 65 perpendicular to the longitudinal axis of the couplers, with wedge surface 69 at an angle, it will be appreciated that the same wedging action could be achieved with surface 69 perpendicular to the longitudinal axis, and step 65 at a small angle, with the edges and surfaces of the slots configured accordingly.

As pointed out above, the non-circular cross sectional configuration of the male coupling element, and the corresponding configuration of the internal bore of the female coupling element, cooperate to prevent slip and to permit torque transmission through the coupler, which is necessary in some drilling operations. In the preferred embodiment, the non-circular cross section is provided by flat raised portions 24 and 26, and their counterparts on the opposite side of the male coupler element. These flat raised surfaces provide rectangular protrusions which break up the otherwise cylindrical surface 23 of the male coupling element. However, it will be appreciated that instead of the rectangular projections, any type of non-circular configuration could be used, including but not limited to a toothed or notched configuration. Also, such non-circular configuration can either project from the cylindrical surface 23, or be recessed into the cylindrical surface, with corresponding projections on the inside of the female coupling element.

The coupler provided by the present invention is very quick and simple in operation. After the two pipe ends are aligned, they are rotated with respect to each other until their non-circular projections or recesses align. The male element is then simply telescoped into the female element, the key means slipped into place, and the lock nuts installed and tightened down. The entire operation can be performed in a matter of seconds, and the resulting junction of the pipes is very compact so as to cause minimum interference with the drilling process.

I claim:

1. A pipe coupler comprising:
   a. a male coupler element having a rearward end adapted for attachment to a pipe and a fluid passageway through said element generally along the longitudinal axis thereof, said element having a non-circular cross sectional configuration and a pair of recesses formed in the outer surface of said element on opposite sides thereof, said recesses having forward walls transverse to said longitudinal axis;
   b. a female coupler element having a rearward end adapted for attachment to a pipe, the forward portion of said element having a non-circular bore configured to conform to the outside shape of said male coupler element for telescopic non-rotational engagement therewith, said female coupler element having an internal narrowing step adjacent said forward portion for abutment with the forward end of said male coupler element when telescopically engaged therewith, said step having a fluid passageway therethrough in alignment with the fluid passageway of said male coupler element, said female coupling element having a pair of slots formed therein extending parallel to each other on opposite sides thereof in alignment with said recesses of said male coupler element when telescoped in said female coupler element;
   c. key means including a pair of key blocks each sized to fit within one of said slots in position within said recess, each key block having a first edge for engagement with a surface of the slot of said female coupler element and having a second edge at an acute angle to said first edge for wedging engagement with said forward wall of said recess; and
   d. means for securing said key blocks within said slots so as to wedge said male coupling element into place with its forward end in fluid sealing abutment with said internal step of said female coupling element.

2. A pipe coupler according to claim 1 wherein said means for securing the key blocks comprise bolts attached to said key blocks, tabs formed in said female coupler element adjacent said slots and having apertures for receiving said bolts, and nuts for securing said bolts to said tabs.

3. A pipe coupler according to claim 1 wherein the non-circular cross sectional configuration of said male coupler element comprises raised rectangular portions formed in said male coupler element, and corresponding recessed rectangular portions formed in the bore in the female coupler element.

4. A pipe coupler according to claim 1 wherein said key blocks are interconnected and held in alignment for insertion in said slots by a bridge member.

5. A pipe coupler according to claim 1 wherein said female coupler element has a cylindrical outer surface, and wherein the outer surface of said key means is curved to form a continuation of the cylindrical surface of the female coupler element when said key means is inserted in place.

* * * * *